United States Patent
Kwak et al.

(10) Patent No.: US 8,954,326 B2
(45) Date of Patent: Feb. 10, 2015

(54) APPARATUS AND METHOD FOR VOICE COMMAND RECOGNITION BASED ON A COMBINATION OF DIALOG MODELS

(75) Inventors: Byung-Kwan Kwak, Tongin-si (KR); Chi-Youn Park, Suwon-si (KR); Jeong-Su Kim, Yongin-si (KR); Jeong-Mi Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 13/245,032

(22) Filed: Sep. 26, 2011

(65) Prior Publication Data

US 2012/0173244 A1 Jul. 5, 2012

(30) Foreign Application Priority Data

Jan. 4, 2011 (KR) ........................ 10-2011-0000578

(51) Int. Cl.
*G10L 15/26* (2006.01)
*G10L 17/00* (2013.01)
*G10L 21/00* (2013.01)
*G10L 15/22* (2006.01)

(52) U.S. Cl.
CPC ........... *G10L 15/22* (2013.01); *G10L 2015/228* (2013.01)
USPC ........ 704/246; 704/235; 704/270; 704/270.1; 704/275

(58) Field of Classification Search
CPC ......... G10L 15/26; G10L 21/06; G10L 15/22; G10L 15/265; G10L 21/00; G10L 25/48; G10L 15/00; G10L 17/22; G10L 21/10; G10L 17/00; G10L 17/005; G10L 15/1822; G10L 15/28; G06F 3/167; G06F 17/21; H04M 2201/40; H04M 2250/74; H04M 3/4936; B60K 28/06; B60R 16/0373; G01C 21/206; G01C 21/3629; G06K 9/00288
USPC ...................... 704/275, 235, 246, 270, 270.1
See application file for complete search history.

(56) References Cited

U.S. PATENT DOCUMENTS 6,192,337 B1 * 2/2001 Ittycheriah et al. ........... 704/231
6,269,335 B1 * 7/2001 Ittycheriah et al. ........... 704/270

(Continued)

FOREIGN PATENT DOCUMENTS

WO   WO 99/16051   * 4/1999 ................ G10L 5/06

OTHER PUBLICATIONS

Kim) "A Frame-Based Probabilistic Framework for Spoken Dialog Management Using Dialog Examples", Proceeding SIGdial '08 Proceedings of the 9th SIGdial Workshop on Discourse and Dialogue pp. 120-127.*

(Continued)

*Primary Examiner* — Edgar Guerra-Erazo
(74) *Attorney, Agent, or Firm* — NSIP Law

(57) ABSTRACT

Provided are a voice command recognition apparatus and method capable of figuring out the intention of a voice command input through a voice dialog interface, by combining a rule based dialog model and a statistical dialog model rule. The voice command recognition apparatus includes a command intention determining unit configured to correct an error in recognizing a voice command of a user, and an application processing unit configured to check whether the final command intention determined in the command intention determining unit comprises the input factors for execution of an application.

18 Claims, 10 Drawing Sheets

(56) References Cited

U.S. PATENT DOCUMENTS

| | | | |
|---|---|---|---|
| 7,200,555 B1* | 4/2007 | Ballard et al. | 704/235 |
| 7,293,015 B2* | 11/2007 | Zhou | 1/1 |
| 7,299,181 B2* | 11/2007 | Ju et al. | 704/257 |
| 7,562,082 B2* | 7/2009 | Zhou | 1/1 |
| 8,175,617 B2* | 5/2012 | Rodriguez | 455/456.1 |
| 8,255,219 B2* | 8/2012 | Braho et al. | 704/251 |
| 8,600,747 B2* | 12/2013 | Abella et al. | 704/239 |
| 2002/0087525 A1* | 7/2002 | Abbott et al. | 707/3 |
| 2006/0004572 A1* | 1/2006 | Ju et al. | 704/243 |
| 2006/0247915 A1* | 11/2006 | Bradford et al. | 704/1 |
| 2007/0143100 A1* | 6/2007 | Agapi et al. | 704/9 |
| 2007/0219974 A1* | 9/2007 | Chickering et al. | 707/4 |
| 2007/0239637 A1* | 10/2007 | Paek et al. | 706/20 |
| 2007/0287473 A1* | 12/2007 | Dupray | 455/456.1 |
| 2008/0052073 A1* | 2/2008 | Goto et al. | 704/251 |
| 2008/0247519 A1* | 10/2008 | Abella et al. | 379/88.04 |
| 2009/0282114 A1* | 11/2009 | Feng et al. | 709/206 |
| 2009/0287626 A1* | 11/2009 | Paek et al. | 706/46 |
| 2009/0326949 A1* | 12/2009 | Douthitt et al. | 704/260 |
| 2010/0202670 A1* | 8/2010 | Tian et al. | 382/118 |
| 2011/0082688 A1* | 4/2011 | Kim et al. | 704/9 |
| 2011/0112827 A1* | 5/2011 | Kennewick et al. | 704/9 |
| 2011/0131040 A1* | 6/2011 | Huang et al. | 704/231 |
| 2013/0128060 A1* | 5/2013 | Rhoads et al. | 348/207.1 |
| 2013/0191122 A1* | 7/2013 | Mason | 704/231 |

OTHER PUBLICATIONS

Agarwal), "Towards a PURE Spoken Dialogue System for Information Access", Rajeev Agarwal, Proceeding ISDS '97 Interactive Spoken Dialog Systems on Bringing Speech and NLP Together in Real Applications, pp. 90-97.*

* cited by examiner

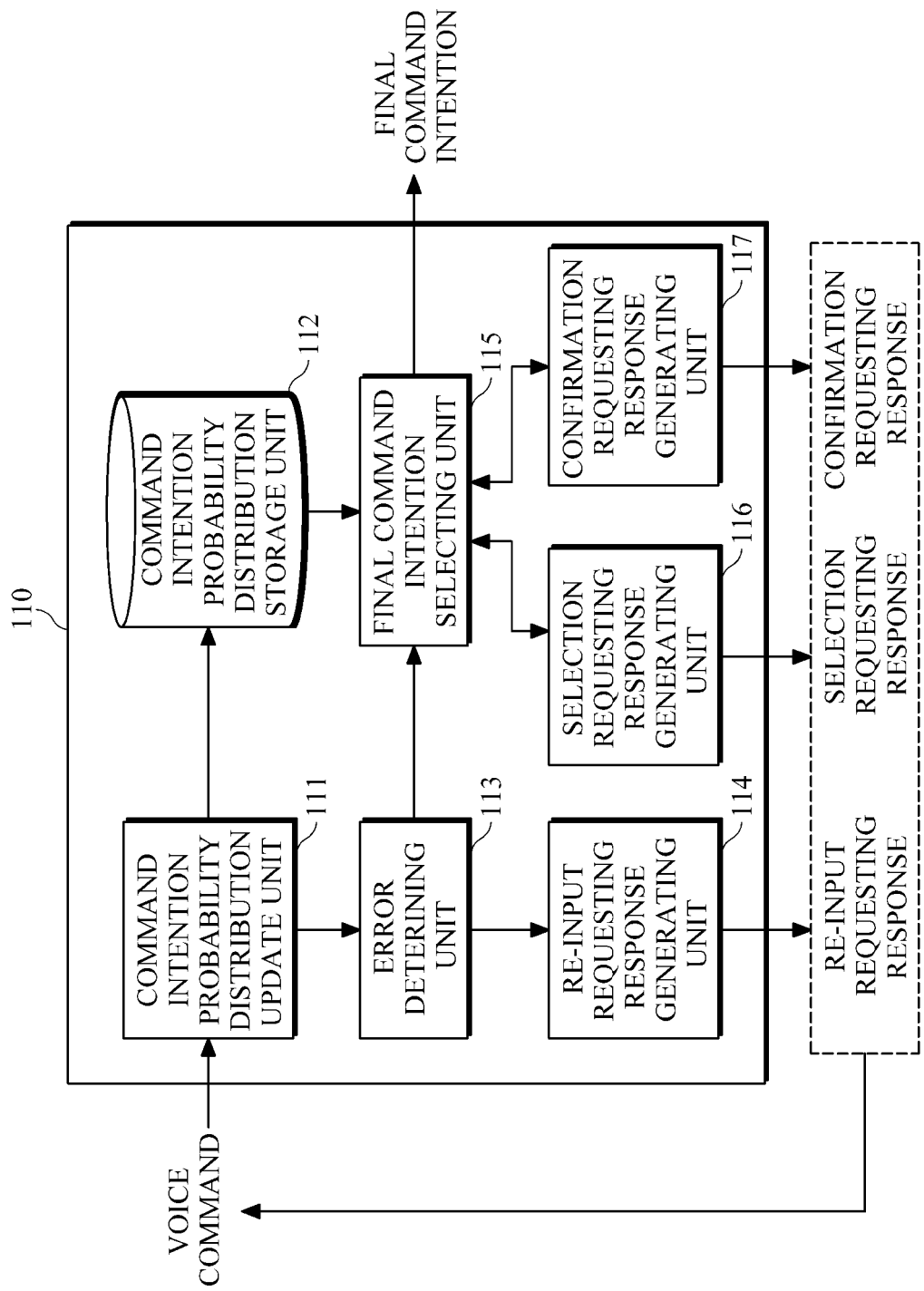

FIG. 3A

| VOICE COMMAND | COMMAND INTENTION PROBABILITY DISTRIBUTION | | RESPONSE |
|---|---|---|---|
| "WHAT'S ON TV?" | CHANNEL SCAN(0.60) RESERVE - RECORDING(0.25) CHANNEL CHANGE(0.15) | ⇨ | "DO YOU WANT CHANNEL SCAN?" |
| "WHAT'S ON TV CHANNEL KBS?" | CHANNEL SCAN(0.65) RESERVE - RECORDING(0.30) CHANNEL CHANGE(0.05) | ⇨ | "DO YOU WANT TUNE IN CHANNEL KBS?" |
| "HOW'S THE WEATHER TOMORROW…" | CHANNEL SCAN(0.55) RESERVE - RECORDING(0.30) WEATHER FORECAST(0.10) CHANNEL CHANGE(0.05) | ⇨ | "PLEASE INPUT VOICE COMMAND AGAIN." |

FIG. 3B

| VOICE COMMAND | COMMAND INTENTION PROBABILITY DISTRIBUTION | | RESPONSE |
|---|---|---|---|
| "WHAT'S ON TV?" | CHANNEL SCAN(0.60)<br>RESERVE - RECORDING(0.25)<br>CHANNEL CHANGE(0.15) | ⇨ | "DO YOU WANT CHANNEL SCAN?" |
| "WHAT'S ON TV CHANNEL KBS?" | CHANNEL SCAN(0.65)<br>RESERVE - RECORDING(0.30)<br>CHANNEL CHANGE(0.05) | ⇨ | "DO YOU WANT TUNE IN CHANNEL KBS?" |
| "TURN INTO KBS." | CHANNEL CHANGE(0.80)<br>RESERVE - RECORDING(0.15)<br>CHANNEL SCAN(0.05) | ⇨ | "WHICH CHANNEL DO YOU WANT TO WATCH BETWEEN KBS1 AND KBS?" |

FIG. 3C

| VOICE COMMAND | COMMAND INTENTION PROBABILITY DISTRIBUTION | | RESPONSE |
|---|---|---|---|
| "WHAT'S ON TV CHANNEL OF MUNHWA BROADCASTING CORPORATION?" | CHANNEL SCAN(0.60) RESERVE - RECORDING(0.25) CHANNEL CHANGE(0.15) | ⇨ | "DO YOU WANT TUNE IN CHANNEL MBC?" |

FIG. 4B

| VOICE COMMAND | FINAL COMMAND INTENTION | SERVICE RULE | RESPONSE |
|---|---|---|---|
| "CHANGE CHANNEL" | CHANNEL CHANGE | CHANNEL NAME (KBS 1, KBS 2, MBC, SBS) | "WHICH CHANNEL DO YOU WANT TO WATCH" |
| "WHAT'S ON TV CHANNEL EBS?" | CHANNEL CHANGE | CHANNEL NAME (KBS 1, KBS 2, MBC, SBS) | "SORRY, BUT EBS IS NOT SUPPORTED. PLEASE SELECT ANOTHER CHANNEL." |
| "WHAT'S ON TV CHANNEL MBC?" | CHANNEL CHANGE | CHANNEL NAME (KBS 1, KBS 2, MBC, SBS) | "CHANNEL CHANGE INTO MBC HAS BEEN MADE" | ered
APPARATUS AND METHOD FOR VOICE COMMAND RECOGNITION BASED ON A COMBINATION OF DIALOG MODELS

CROSS-REFERENCE TO RELATED APPLICATION

This application claims the benefit under 35 U.S.C. §119(a) of Korean Patent Application No. 10-2011-0000578, filed on Jan. 4, 2011, in the Korean Intellectual Property Office, the entire disclosure of which is incorporated herein by reference for all purposes.

BACKGROUND

1. Field

The following description relates to a voice command recognition technique, and in addition, to an apparatus and method for voice command recognition that is based on a combination of dialog models in a voice dialog user interface.

2. Description of the Related Art

A voice dialog interface is widely used in various applications such as inputting a reservation number for a flight, making a reservation for a train, using an automated teller machine, and the like. In order to use a system based on a voice dialog interface, a dialog model should be set in the system.

An example of a voice command recognition model is a rule based dialog model, in which a dialog proceeds based on a single hypothesis regarding the result of voice recognition. However, in the case of the rule based dialog model, every possible response needs to be previously input into the system or the input will not be recognized Another example of a voice command recognition model is a statistical dialog model, in which the recognition result of a voice command is assumed as a probability having a plurality of possibilities, and the optimum response is determined based on the probabilities. Different from the rule based dialog model, in the statistical dialog model, all possible dialogs do not need to be constructed individually, and a recognition error is subject to a confirmation process such that the intention of a command may be determined, thereby constructing a potentially more stable dialog model.

SUMMARY

In one general aspect, there is provided an apparatus for voice command recognition based on a combination of dialog models, the apparatus including a command intention determining unit configured to correct an error in recognizing a voice command of a user through a command intention probability distribution of a vocally commanded intention corresponding to the voice command of a user, and configured to determine a final command intention of the voice command, and an application processing unit configured to check whether the final command intention determined by the command intention determining unit comprises is all input factors for execution of an application, to acquire information related to one or more missing input factors from the user, and to generate an execution signal of the application corresponding to the final command intention.

The command intention determining unit may comprise a command intention probability distribution update unit configured to update the command intention probability distribution corresponding to the voice command of the user, an error determining unit configured to determine the error in recognizing the voice command or configured to determine an error in figuring out the command intention through a updated command intention probability distribution, and a re-input requesting response generating unit configured to request re-input of the voice command if the error determining unit determines that an error occurs.

The command intention determining unit may comprise a final command intention selecting unit configured to select the final command intention in the updated command intention probability, if the error determining unit determines that an error does not occur.

The command intention determining unit may comprise a selection requesting response generating unit configured to generate a response requesting selection of a candidate for the final command intention of the updated command intention probability distribution.

The command intention determining unit may comprise a confirmation requesting response generating unit configured to generate a request for requesting confirmation of the final command intention of the updated command intention probability distribution.

The application processing unit may comprise an input factor checking unit configured to check whether the final command intention comprises all of the input factors for execution of the application, and a user intention adding unit configured to request one or more missing input factors if one or more of the input factors for execution of the application are missing from the final command intention.

The application processing unit may further comprise a reliability checking unit configured to check whether the input factor is an input factor that is available to execute the application if the final command intention comprises all the input factors for executing the application, and a user intention checking unit configured to request re-input corresponding to an unavailable input factor if the unavailable input factor is an input factor for executing the application.

In another aspect, there is provided a portable communication device including a voice interface unit configured to receive a voice command signal corresponding to a voice command of a user, and to output a voice response, a voice command recognition unit configured to correct an error in recognizing the voice command through a command intention probability distribution of a command intention corresponding to the voice command signal that is input through the voice interface, to determine a final command intention of the voice command, to check whether the final command intention comprises all input factors for execution of an application, to acquire information related to one or more missing input factors from the user, and to generate an application execution signal of the application corresponding to the final command intention, and an operating unit configured to operate the application according to the application execution signal that is generated in the voice command recognition unit.

The portable communication device may further comprise a communication unit configured to perform a wired/wireless communication with a web server, wherein the portable communication device downloads related information from the web server through the communication unit according to the application execution signal that is generated in the voice command recognition unit.

In another aspect, there is provided a method of voice command recognition based on a combination of dialog models, the method including correcting an error in recognizing a voice command of a user through a command intention probability distribution of a command intention corresponding to the voice command, determining a final command intention of the voice command, checking whether the determined final command intention comprises all of the input factors for execution of an application, acquiring information related to one or more missing input factors from the user, and generating an execution signal of the application corresponding to the final command intention.

The determining of the final command intention may comprise updating the command intention probability distribution corresponding to the voice command of the user, determining the error in recognizing the voice command or an error in figuring out the command intention through a updated command intention probability distribution, and requesting re-input of the voice command if a result of the determination is that an error occurs.

The generating of the execution signal of the application may comprise checking whether the final command intention comprises all of the input factors for execution of the application, and requesting one or more missing input factors if one or more of the input factors for execution of the application are missing from the final command intention.

The generating of the execution signal of the application may comprise checking whether each of the input factors is an input factor available to execute the application, if the final command intention comprises all the input factors for executing the application, and requesting re-input corresponding to an unavailable input factor, if the unavailable input factor is an input factor for executing the application.

In another aspect, there is provided a command intention determiner including an update unit configured to generate and to update a command intention probability distribution based on dialog spoken by a user, an error determining unit configured to compare an input voice command to the command intention probability distribution to determine whether an error recognition occurs in the input voice command, and a request unit configured to request a user to is repeat an input voice command, in response to the comparison performed by the error determining unit determining that an error occurs in the input voice command.

The command intention probability distribution may be calculated through a statistical dialog modeling.

The command intention determining unit may further comprise a command intention selecting unit configured to select a command intention that has a probability that exceeds a threshold value in the command intention probability distribution, in response to the comparison performed by the error determining unit determining that an error does not occur in the input voice command.

The command intention determining unit may further comprise a confirmation request unit, wherein the command intention selecting unit is further configured to determine whether a plurality of command intentions have a probability that exceeds the threshold value, and the confirmation request unit requests the user for a confirmation of the selected command intention, in response to the plurality of command intentions exceeding the threshold value.

Other features and aspects may be apparent from the following detailed description, the attached drawings, and the claims.

BRIEF DESCRIPTION OF THE DRAWINGS

FIG. 2 is a diagram illustrating an example of a command intention determining unit of the apparatus of FIG. 1.

FIG. 3A is a diagram illustrating an example of responses that are generated when errors occur in a voice command recognition.

FIG. 3B is a diagram illustrating an example of a selection requesting response that is generated when errors occur while determining a command intention.

FIG. 3C is a diagram illustrating an example of a confirmation requesting response that is generated when the command intention is uncertain.

FIG. 4B is a diagram illustrating an example of situational responses that occur while an application is being processed.

Figure 1:
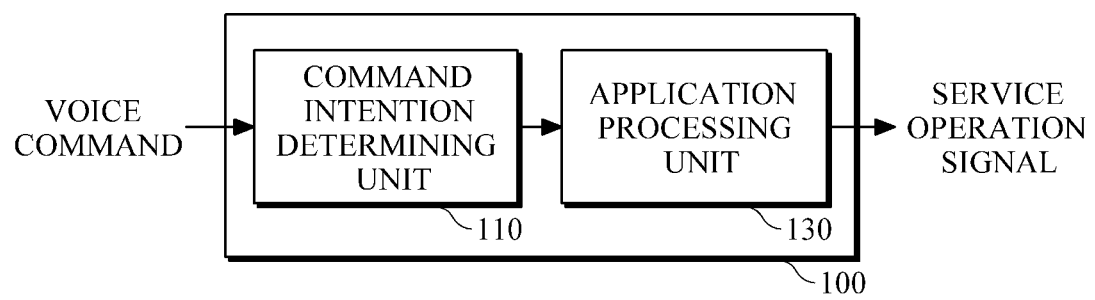
FIG. 1 is a diagram illustrating an example of an apparatus for voice command recognition.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for voice command recognition. The apparatus may be or may be included in a terminal, for example, a computer, a mobile terminal, a smart phone, a camera, an MP3 player, a tablet, a home appliance, and the like.

Referring to FIG. 1, an apparatus 100 for voice command recognition includes a command intention determining unit 110 and an application processing unit 130. The command intention determining unit 110 may generate a command intention probability distribution of a command intention that corresponds to a voice command of a user. The command intention probability distribution may represent a probability distribution that corresponds to various situations that are expected based on a current state of a dialog flow.

The command intention determination unit 110 may correct an error in recognizing a voice command input using the command intention probability distribution, and may determine a final command intention of the voice command. For example, the command intention determining unit 110 may use a statistical dialog model. For example, the statistical dialog model may be obtained through a Partially Observable Markov Decision Process (POMDP).

The application processing unit 130 may check whether the final command intention determined in the command intention determining unit 110 includes the one or more input factors needed for execution of an application. The application processing unit 130 may use a knowledge based dialog model. The application processing unit 130 may process content of the application using an application rule for each application. The application processing unit 130 may analyze the final command intention, and upon a lack of an input factor, may acquire information related to the corresponding input factor from the user. The application processing unit 130 may generate an execution signal if there is no problem in executing the corresponding application according to the application rule.

FIG. 2 illustrates an example of a command intention determining unit of the apparatus of FIG. 1.

Referring to FIG. 2, the command intention determining unit 110 includes a command intention probability distribution update unit 111, a command intention probability distribution storage unit 112, an error determining unit 113, a re-input requesting response generating unit 114, a final command intention selecting unit 115, a selection requesting response generating unit 116, and a confirmation requesting response generating unit 117.

The command intention probability distribution update unit 111 may update the command intention probability distribution corresponding to a voice command of the user while dialog is being spoken. For example, the command intention probability distribution update unit 111 may probabilistically update the accuracy in the recognition of the voice command of the user while a user is speaking. The command intention probability distribution update unit 111 may store the updated command intention probability distribution in the command intention probability distribution storage unit 112. The command intention probability distribution update unit 111 may output the updated command intention probability distribution to the error determining unit 113.

The error determining unit 113 may determine an error in recognizing the voice command and/or an error in figuring out the command intention through the updated command intention probability distribution that is updated by the command intention probability distribution update unit 111. For example, the error determining unit 113 may determine whether the command intention corresponding to the voice command input is certain. If the error determining unit 113 determines that the voice command input contains no error or that the command intention is certain, the updated probability distribution may be output to the final command intention selecting unit 115. However, if the error determining unit 113 determines that the voice command input contains an error or that the command intention is uncertain, error information may be output to the re-input requesting response generating unit 114.

The re-input requesting response generating unit 114 may generate a response requesting is re-input of the voice command, in response to the error determining unit 113 determining that the voice command contains an error. In response to the user re-inputting the voice command, the error determining unit 113 may determine whether the error is removed through the newly input voice command. An example of a process for determining an error in the error determining unit 113 and a process of generating a response in the re-input response generating unit 11 are described with reference to FIG. 3A.

The final command intention selecting unit 115 may select a final command intention in the updated command intention probability distribution, if the error determining unit 113 determines that an error does not occur. For example, the final command intention selecting unit 115 may select a command intention that has a probability that exceeds a threshold value in the updated probability intention probability distribution, as the final command intention. If an error in recognizing the command does not occur, however, the command intention is uncertain, the final command intention selecting unit 115 may perform controls to generate a response that requests a user to make the voice command more certain. If the final command intention is certain, the final command intention may be output to the application processing unit 130.

If there are candidates for the final command intention that have close probabilities in the updated command intention probability distribution, the selection requesting response generating unit 116 may generate a request that requests selection of one of the candidates. A voice command may be input by the user in response to the request generated by the selection requesting response generating unit 116, and the final command intention may be more reliably selected.

The confirmation requesting response generating unit 117 may generate a request that requests confirmation of the final command intention in the updated command intention probability distribution. A voice command may be input by the user in response to the request generated in the confirmation requesting response generating unit 117, and the final command is intention may be more reliably selected. The description regarding a process of selecting the final command intention in the final command intention selecting unit 115 and an example of responses of the confirmation requesting response generating unit 117 are further described with reference to FIGS. 3B to 3C.

FIG. 3A illustrates an example of responses that are generated when errors occur in voice command recognition. FIG. 3B illustrates an example of a selection requesting response that is generated when errors occurs while figuring out a command intention. FIG. 3C illustrates an example of a confirmation requesting response that is generated when the command intention is uncertain.

Referring to FIG. 3A, a voice command requesting "what's on the TV" or "what's on channel KBS" is input by a user, and the command intention probability distribution update unit 111 may set the probability of a command intention corresponding to a channel scan to be high. In this example, a voice command which is not related to a previous subject, for example, a voice command "how is the weather tomorrow" or "I hope the weather is fine tomorrow" is the next input of the user. Accordingly, the command intention probability distribution update unit 111 may determine the voice command as an error in recognizing the voice command or an error in figuring out the command intention. At this time, the re-input requesting response generating unit 114 may generate a response indicating "please input the voice command again". For example, if a voice command regarding a weather forecast is input in the middle of a channel scan related dialog, the command intention of the user may be determined to be uncertain, and a re-input requesting response may be generated.

As another example, a recognition error may occur in response to foreign languages or other vocabularies corresponding to a voice command that is not set in a system. Accordingly, the re-input requesting response generating unit 114 may generate a re-input requesting message. The user may input the voice command again in response to the re-input requesting message. In this example, a result of the re-input may be compared with a previous command intention probability distribution, so that the command intention of the user may be more clearly determined.

Referring to FIG. 3B, a voice command requesting "what's on the TV" or "what's on channel MBS" is input by a user, and the command intention probability distribution update unit 111 sets the probability of a command intention corresponding to a channel scan to be high. In this example, a voice command "turn into KBS" is the next input of the user, and the probability of a command intention corresponding to a channel change is increased in the command intention probability distribution. In this example, the channel KBS set in a system includes KBS1 and KBS2. Therefore, it may be uncertain which of KBS1 and KBS2 the user wants. Accordingly, the re-input requesting response generating unit 114 may generate a selection requesting response such as "which channel do you want to watch between KBS1 and KBS2."

Channels KBS1 and KBS2 are candidates for the final command intention. That is, in this example, two candidates are generated for the final command intention. However, according to another example, a plurality of candidates may be generated for the final command intention. A selection requesting response, which requests selection of one of the candidates for the final command intention, may be generated, and the user may input a voice command for selecting a channel such that the final command intention selecting unit 115 may more clearly determine the command intention of the user.

Referring to FIG. 3C, a voice command requesting "what's on TV the channel of Munhwa Broadcasting Corporation?" is input by the user, and the probability of a command intention corresponding to a channel scan may be set to be the highest. In this example, the channel of "Munhwa Broadcasting Corporation" corresponds to "MBC", and a confirmation process may be performed. Accordingly, the confirmation requesting response generating unit 117 may generate a request "Do you want to find channel MBC?" Accordingly, the user may input a voice command "yes" or "no." In this manner, the final command intention becomes clearer.

Figure 4A:
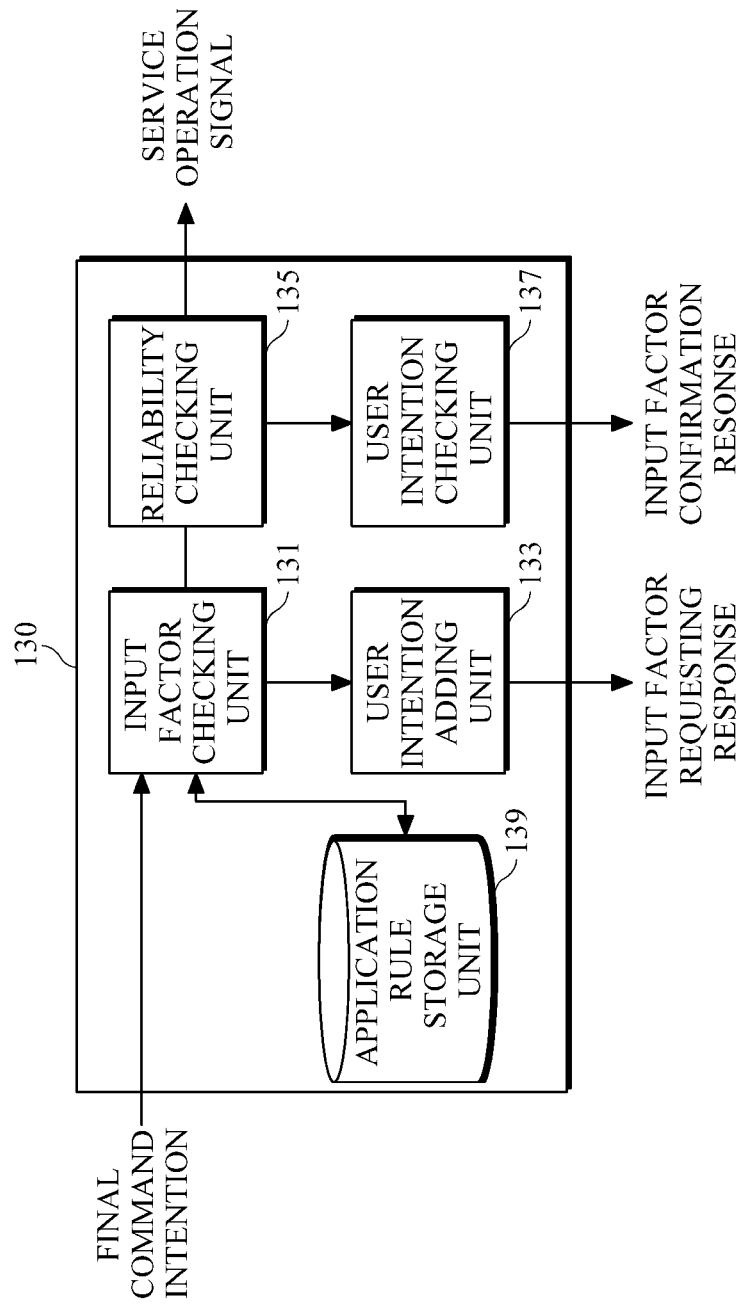
FIG. 4A is a diagram illustrating an example of an application processing unit of the apparatus of FIG. 1.

FIG. 4A illustrates an example of an application processing unit of the apparatus of FIG. 1.

Referring to FIG. 4A, the application processing unit 130 includes an input factor checking unit 131, a user intention adding unit 133, a reliability checking unit 135, a user intention checking unit 137, and an application rule storage unit 139.

The input factor checking unit 131 may check whether the final command intention input from the command intention determining unit 110 includes all of the input factors that are used for execution of an application. The input factor checking unit 131 may determine whether the final command intention satisfies an application rule that is stored in the application rule storage unit 139. For example, for an application of TV channel change, the channel name or the channel number may serve as an input factor. If not all of the input factors are certain, an execution signal of the application is not generated and an excluded input factor is requested from the user.

The user intention adding unit 133 may request an excluded input factor if one or more of the input factors for execution of a corresponding application are missing from the final command intention. The user intention adding unit 133 may generate a sub-dialog and output the generated sub-dialog. The user may input a voice command corresponding to the generated sub-dialog, and the apparatus 100 may acquire information about the missing input factor and may use the information for execution of the corresponding application.

The reliability checking unit 135 may check whether the input factor is an input factor available for executing the application if the final command intention includes all the input factors for executing the application. For example, the reliability checking unit 135 may check the reliability of each input factor included in the final command intention and determine whether each input factor is available to execute a corresponding application without causing an error. In this example, the reliability may be calculated as a reliability value for each input factor obtained through a linguistic interpretation and a dialog management. If the reliability exceeds a predetermined threshold value, an execution signal of an application may be transmitted to a module (not shown) for providing an application. However, if the reliability of one or more input factors is below a predetermined threshold value, the intention of a user may be checked.

The user intention checking unit 137 may request a re-input corresponding to an unavailable input factor. The user intention checking unit 137 may generate a sub-dialog to confirm the intention of a user and output the generated sub-dialog. The user may input a voice command corresponding to the generated sub-dialog, and the apparatus may acquire information about an available input factor for executing a service.

An example of the input factor checking unit 131, the user intention adding unit 133, the reliability checking unit 135 and the user intention checking unit 137 are described with reference to FIG. 5.

FIG. 4B illustrates an example of the situational responses that occur while an application is being processed.

Referring to FIG. 4B, the voice command of a user is "change channel" and the final command intention is "channel change." The input factor checking unit 131 may determine whether the final command intention includes all input factors that are used for execution of a corresponding application by use of the application rule. In this example, an input factor corresponding to a channel name is missing from the final command intention. Accordingly, the user intention adding unit 133 may generate a request requesting "which channel do you want to watch?" The user may input a channel name in response, and an execution signal of the is application may be output.

As another example, the voice command of the user may be "what's on channel EBS?" and the final command intention may be "channel change." Because the channel name "EBS" serving as an input factor is input, the input factor checking unit 131 outputs the final command intention to the reliability checking unit 135. The reliability checking unit 135 may determine whether it is available to perform a channel change into EBS, based on the final command intention by use of the application rule. If the channel EBS does not exist in the application rule, the user intention checking unit 137 may generate a response indicating "sorry, but EBS is not supported. Please select another channel."

As another example, the voice command of the user may be "what's on MBC", and the final command intention may be "channel change." Because the channel name "MBC" serving as an input factor is input, the input factor checking unit 131 may output the final command intention to the reliability checking unit 135. The reliability checking unit 135 may determine whether it is available to perform a channel change into MBC based on the final command intention by use of the application rule. If the channel MBC exists in the application rule, the corresponding voice command is determined to be available. In this example, the user intention checking unit 137 may generate a response "channel change into MBC has been made" notifying the execution of the corresponding application to the user. FIG. 5 illustrates a portable communication device including the apparatus of FIG. 1.

Figure 5:
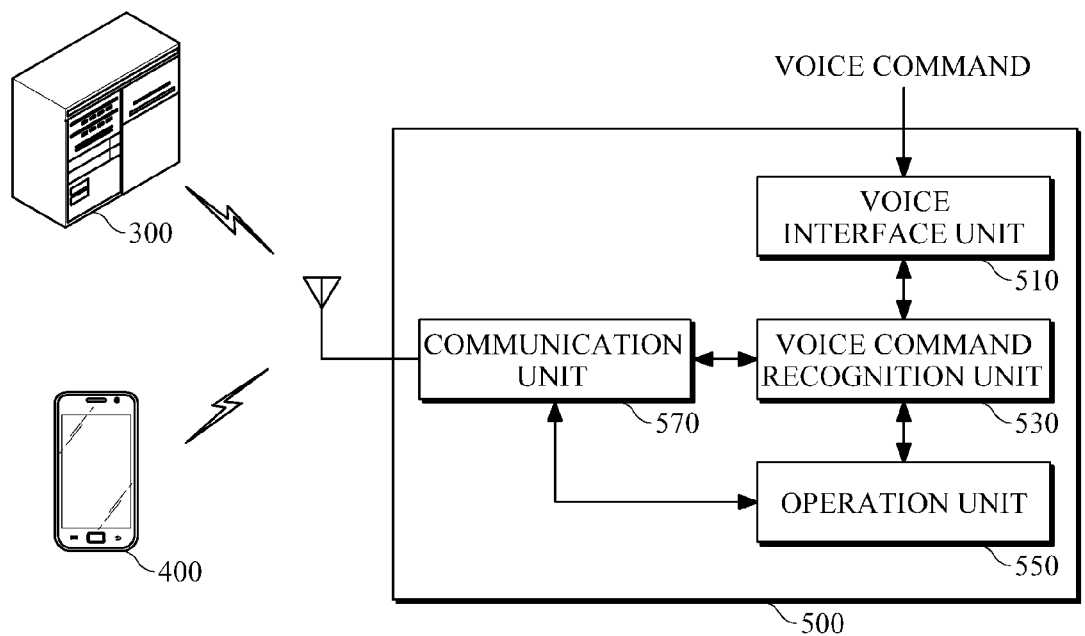
FIG. 5 is a diagram illustrating a portable communication device including the apparatus of FIG. 1.

Referring to FIG. 5, portable communication device 500 includes a voice interface unit 510, a voice command recognition unit 530, an operation unit 550, and a communication unit 570. The voice interface unit 510 may include a microphone to receive the voice of a user and a speaker to output the voice. The voice interface unit 510 may receive a voice command signal of a user and output a voice response.

The voice command recognition unit 530 may correct an error in recognizing the voice is command signal through a command intention probability distribution of a command intention corresponding to the voice command signal that is input through the voice interface unit 510. The voice command recognition unit 530 may determine a final command intention of the voice command. The voice command recognition unit 530 may check whether the final command intention includes an input factor for execution of a corresponding application, and may acquire information related to the input factor from the user upon a lack of the input factor, thereby generating an application execution signal of the application corresponding to the final command intention. The operation unit 550 may operate the application according to the application execution signal that is generated in the voice command recognition unit 530. The operation unit 550 may control operation modules that are related to each application.

In this example, the portable communication device 500 includes the communication unit 570. The communication unit 570 may perform a wired/wireless communication with a web server 300. For example, the portable communication device 500 may download related information from the web server 300 or another portable device 400 through the communication unit 570 according to the execution signal of the application that is generated in the voice command recognition unit 530. For example, if a voice command signal of a user corresponds to downloading a sound source of a predetermined singer from a web server of music contents, the operation unit 550 may control the communication unit 570 to download the corresponding sound source from the web server 300.

As another example, the portable communication device 500 may receive a voice command from another portable device 400. If a user of another communication device 400 inputs a voice command, the portable communication device 500 may analyze the corresponding voice command and execute an application corresponding to the voice command. For example, the portable communication device 500 may be used across many applications, such as remote is controlling through a voice command in a school, at a fire station, at a police station, in home networks, and the like.

Figure 6:
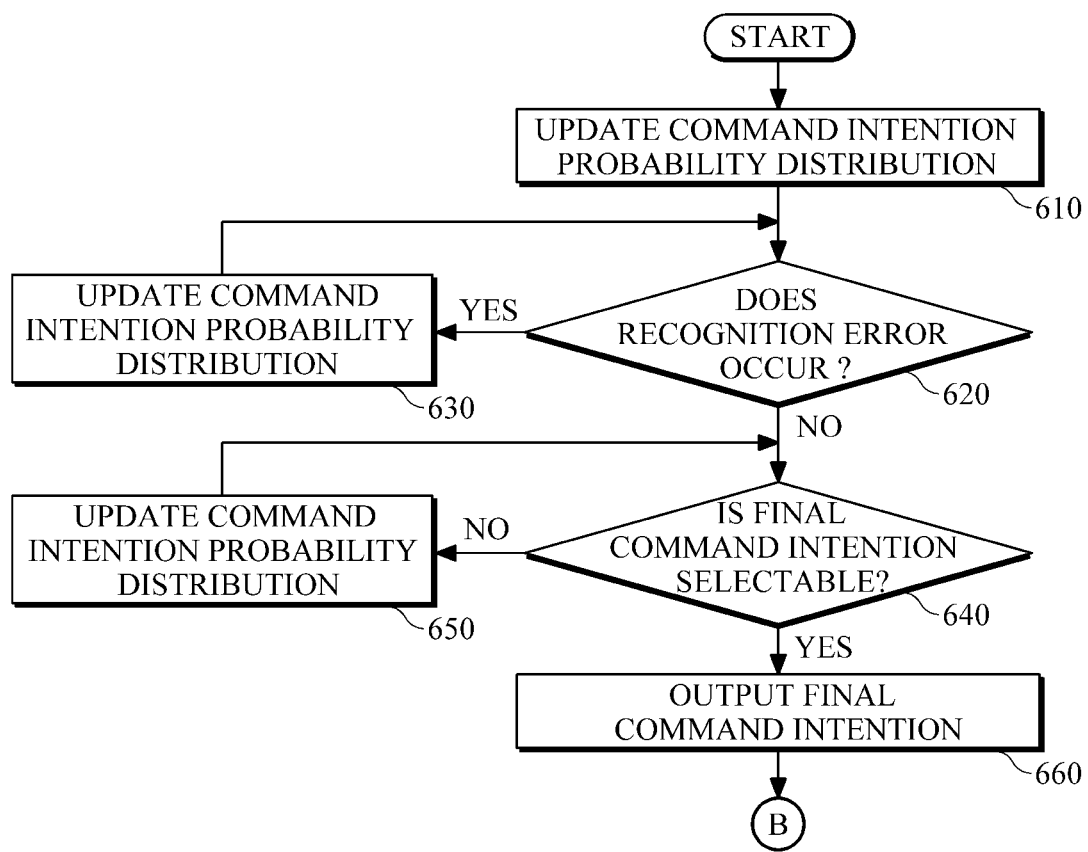
FIG. 6 is a diagram illustrating an example of determining the command intention for voice command recognition.

FIG. 6 illustrates an example of a method for determining the command intention for voice command recognition.

Referring to FIG. 6, the command intention probability distribution is calculated based on a voice command received from a user and is updated while a dialog is carried on (610). For example, the command intention of a user may be obtained through a statistical dialog modeling method. Accordingly, the voice command of the user may be managed based on a plurality of hypothesize, so that unexpected errors in voice command recognition may be handled.

Whether an error occurs in recognizing the voice command or an error whether an error occurs in figuring out the command intention is determined through the updated command intention probability distribution (620). For example, the voice command may not be recognized due to errors contained in the input voice command or the command intention of the voice command may not be figured out. If the voice command contains an error, a response requesting re-input of the voice command is generated (630). Such a sub-dialog allows more accurate voice command to be input by the user, so that the recognition error may be more properly handled.

If an error does not occur, whether a final command intention is available in the updated command intention probability distribution is determined (640). That is, a determination may be made as to whether a plurality of candidates for the final command intention exist in the command intention probability distribution or the only candidate for the final command intention needs to be confirmed. If a final command intention is not selectable among the candidates, a voice command required for selecting the final command intention is input by the user through a sub-dialog (650). If a final command intention is selected, the selected final command intention is output (660).

Figure 7:
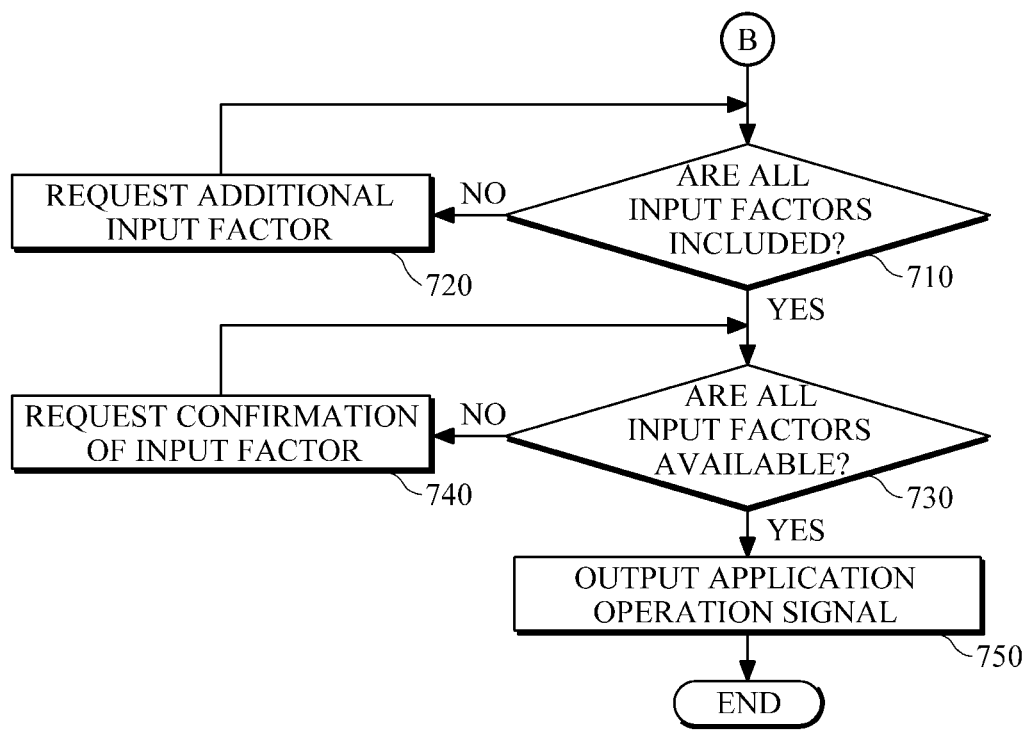
FIG. 7 is a diagram illustrating an example of processing an application for voice command recognition.

FIG. 7 illustrates an example of processing an application for voice command recognition.

Referring to FIG. 7, a final command intention is received and it is determined whether the final command intention includes all input factors for execution of a corresponding application (710). The missing input factor may be set differently with each application and limited according to the application rule. For example, if some of the input factors are missing from the final command intention, a response requesting the missing input factor is generated (720). That is, a voice command including the missing input factor may be received through a sub-dialog requesting the corresponding input factor.

However, if the final command intention includes all the input factors for execution of the application, whether the input factors are available to execute the corresponding application is checked (730). If an unavailable input factor exists among the input factors included in the final command intention, a response requesting confirmation of the input factor is generated (740). In this example, a confirmation about whether the corresponding input factor is available may be made through a sub-dialog, and then a voice command including an available input factor may be received from the user. If all the input factors included in the final command intention are available, an execution signal capable of executing the corresponding application is output (750).

As described in various examples herein, a recognition error about the intention of a voice command that is input by a user through a voice dialog interface, may be processed through a statistical dialog model, and a decision about a request of an application may be processed through a rule based dialog model, thereby processing various types of errors in a natural manner and rapidly controlling the flow of a dialog.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/portable device/communication unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for voice command recognition based on a combination of dialog models, the apparatus comprising:
   a command intention determining unit configured to recognize a command intention of a voice command of a user through a command intention probability distribution corresponding to the voice command of a user; and
   an application processing unit configured to recognize the command intention to select an application corresponding to the command intention, and to generate an execution signal of the application.

2. The apparatus of claim 1, wherein the command intention determining unit is configured to correct an error in recognizing a voice command of a user through a command intention probability distribution corresponding to the voice command of a user, and configured to determine a final command intention of the voice command, and wherein the command intention determining unit comprises:
   a command intention probability distribution update unit configured to update the command intention probability distribution corresponding to the voice command of the user;
   an error determining unit configured to determine the error in recognizing the voice command or configured to determine an error in figuring out the command intention through an updated command intention probability distribution; and
   a re-input requesting response generating unit configured to request re-input of the voice command in response to the error determining unit determining that an error occurs.

3. The apparatus of claim 2, wherein the command intention determining unit comprises a final command intention selecting unit configured to select the final command intention in the updated command intention probability in response to the error determining unit determining that an error does not occur.

4. The apparatus of claim 3, wherein the command intention determining unit comprises a selection requesting response generating unit configured to generate a response requesting selection of a candidate for the final command intention of the updated command intention probability distribution.

5. The apparatus of claim 3, wherein the command intention determining unit comprises a confirmation requesting response generating unit configured to generate a request for requesting confirmation of the final command intention of the updated command intention probability distribution.

6. The apparatus of claim 2, wherein an application processing unit configured to check whether the final command intention comprises all input factors for execution of an application, to acquire information related to one or more missing input factors from the user, and to generate an execution signal of the application corresponding to the final command intention, and wherein the application processing unit comprises:
   an input factor checking unit configured to check whether the final command intention comprises all of the input factors for execution of the application; and
   a user intention adding unit configured to request one or more missing input factors in response to one or more of the input factors for execution of the application missing from the final command intention.

7. The apparatus of claim 6, wherein the application processing unit further comprises:
   a reliability checking unit configured to check whether the input factor is an input factor that is available to execute the application in response to the final command intention comprising all the input factors for executing the application; and
   a user intention checking unit configured to request re-input corresponding to an unavailable input factor in response to the unavailable input factor being an input factor for executing the application.

8. A portable communication device comprising:
   a voice interface unit configured to receive a voice command signal corresponding to a voice command of a user, and to output a voice response;
   a voice command recognition unit configured to recognize a command intention of the voice command through a command intention probability distribution corresponding to the voice command signal that is input through the voice interface to recognize the command intention, to select an application corresponding to the command intention, and to generate an execution signal of the appication; and
   an operating unit configured to operate the application according to the application execution signal that is generated in the voice command recognition unit.

9. The portable communication device of claim 8, further comprising a communication unit configured to perform a wired/wireless communication with a web server, wherein the portable communication device downloads related information from the web server through the communication unit according to the application execution signal that is generated in the voice command recognition unit.

10. A method of voice command recognition based on a combination of dialog models, the method comprising:
    correcting an error in recognizing a voice command of a user through a command intention probability distribution of a command intention corresponding to the voice command;
    determining a final command intention of the voice command;
    checking whether the determined final command intention comprises all of the input factors for execution of an application;
    acquiring information related to one or more missing input factors from the user; and
    generating an execution signal of the application corresponding to the final command intention.

11. The method of claim 10, wherein the determining of the final command intention comprises:
    updating the command intention probability distribution corresponding to the voice command of the user;
    determining the error in recognizing the voice command or an error in figuring out the command intention through a updated command intention probability distribution; and
    requesting re-input of the voice command in response to a result of the determination being that an error occurs.

12. The method of claim 10, wherein the generating of the execution signal of the application comprises:
    checking whether the final command intention comprises all of the input factors for execution of the application; and
    requesting one or more missing input factors in response to one or more of the input factors for execution of the application missing from the final command intention.

13. The method of claim 12, wherein the generating of the execution signal of the application comprises:
    checking whether each of the input factors is an input factor available to execute the application in response to the final command intention comprising all the input factors for executing the application; and
    requesting re-input corresponding to an unavailable input factor in response to the unavailable input factor being an input factor for executing the application.

14. A command intention determiner comprising:
    an update unit configured to generate and to update a command intention probability distribution based on dialog spoken by a user;
    an error determining unit configured to compare an input voice command to the command intention probability distribution to determine whether an error recognition occurs in the input voice command; and
    a request unit configured to request a user to repeat an input voice command, in response to the comparison performed by the error determining unit determining that an error occurs in the input voice command.

15. The command intention determining unit of claim 14, wherein the command intention probability distribution is calculated through a statistical dialog modeling.

16. The command intention determining unit of claim 14, further comprising a command intention selecting unit configured to select a command intention that has a probability that exceeds a threshold value in the command intention probability distribution, in response to the comparison performed by the error determining unit determining that an error does not occur in the input voice command.

17. The command intention determining unit of claim 16, further comprising a confirmation request unit,
    wherein the command intention selecting unit is further configured to determine whether a plurality of command intentions have a probability that exceeds the threshold value, and the confirmation request unit requests the user for a confirmation of the selected command intention, in response to the plurality of command intentions exceeding the threshold value.

18. The apparatus of claim 1, wherein the application processing unit comprises an application rule storage unit configured to store an application rule for checking with the final command intention.

* * * * *